United States Patent [19]

Eckart et al.

[11] 4,156,884
[45] May 29, 1979

[54] GROUND FAULT PROTECTION SYSTEM FOR INDUSTRIAL POWER CIRCUITS

[75] Inventors: Gregory C. Eckart, Southington; Keith W. Klein, Simsbury, both of Conn.

[73] Assignee: General Electric Company, New York, N.Y.

[21] Appl. No.: 849,065

[22] Filed: Nov. 7, 1977

[51] Int. Cl.² .............................................. H02H 3/28
[52] U.S. Cl. ......................................... 361/46; 361/50
[58] Field of Search ...................... 361/44, 45, 46, 47, 361/48, 49, 50, 42

[56] References Cited
U.S. PATENT DOCUMENTS

| | | | |
|---|---|---|---|
| 3,158,785 | 11/1964 | Gagniere et al. | 361/47 |
| 3,259,802 | 7/1966 | Steen | 361/48 |
| 3,286,129 | 11/1966 | Gagniere | 361/47 |
| 3,953,766 | 4/1976 | Howell et al. | 361/45 |

Primary Examiner—Patrick R. Salce
Attorney, Agent, or Firm—Robert A. Cahill; Walter C. Bernkopf; Philip L. Schlamp

[57] ABSTRACT

A ground fault circuit interrupting (GFCI) device of the type utilized in low voltage, residential type circuits for personnel protection against ground faults is connected in circuit with a high voltage, high current source so as to trip in response to ground fault current returning to the source via a conductor path solidly connecting the source to ground.

11 Claims, 2 Drawing Figures

GROUND FAULT PROTECTION SYSTEM FOR INDUSTRIAL POWER CIRCUITS

BACKGROUND OF THE INVENTION

In numerous industrial situations, personnel come in physical contact with electrical equipment under conditions highly conducive to electrical shock due to ground faults. Handling of the electrical equipment under any conditions where personnel can become grounded, such as standing on a wet floor, obviously poses the potential for electrical shock. In many cases, industrial electrical equipment is operated at voltage and current levels which are too high for conventional ground fault circuit interrupting (GFCI) devices to accommodate. Thus the highly effective personnel shock protection afforded by conventional GFCI devices utilized in low voltage circuits, e.g., 120 and 240 VAC, is not presently available for circuits operating at higher voltages.

To date, ground fault protection for industrial electrical power circuits has been limited to equipment protection by virtue of the fact that the power circuit is interrupted to clear a ground fault for ground fault currents in the ampere range, much too high for personnel protection considering the fact that conventional GFCI devices must respond to ground fault currents as low as 5 milliamperes. A principle reason for this is that the typical ground fault sensor, e.g., a zero sequence transformer, utilized in industrial power circuits is not sufficiently precise to detect a 5 milliampere differential in the currents flowing to the load and returning to the source as an indirect indication of a 5 milliampere ground fault current. An alternative approach to industrial power circuit ground fault protection is to directly monitor ground fault current utilizing a current transformer coupled with the ground strap solidly connecting the source to ground and through which ground fault current must flow in returning to the source. The current transformer activates a ground fault relay operating to initiate interruption of the industrial power circuit, clearing the ground fault. Again the combination of the ground strap current transformer and ground fault relay is not sufficiently current sensitive to afford effective personnel protection.

It is accordingly an object of the present invention to provide a ground fault protection system for power circuits operating at elevated voltages and currents which affords equipment protection and is also sufficiently sensitive to afford effective personnel protection.

A further object of the present invention is to provide a ground fault protection system of the above character which utilizes as its principle operating component a conventional ground fault circuit interrupting (GFCI) device of the type currently being mass produced for utilization in low voltage, residential type circuits to protect personnel from the hazards of electrical shock due to ground faults.

An additional object of the present invention is to provide a ground fault protection system of the above character which is inexpensive to manufacture, reliable in operation, and convenient to implement.

Other objects of the invention will in part be obvious and in part appear hereinafter.

SUMMARY OF THE INVENTION

Commonly assigned U.S. Pat. No. 4,044,395 and co-pending application Ser. No. 831,709, filed Sept. 9, 1977, the disclosures thereof being specifically incorporated herein by reference, relate to ground fault protection systems for power circuits operating at elevated voltages and currents, wherein the systems utilize as their principal operating component a ground fault circuit interrupting (GFCI) device of the type currently being mass produced for utilization in low voltage, residential type circuits to afford human shock protection occasioned by ground faults. While theoretically these systems could afford personnel protection, in practice, they are capable of affording only equipment protection due to the inherent insensitivity of the ground fault sensor, coupled with the load current carrying conductors of the power circuit, to detect the presence of ground fault currents at the low levels requisite to affording personnel protection. In accordance with the present invention, a conventional GFCI device is again utilized as the principal operating component, but its implementation is such as to render the system capable of affording personnel protection from ground faults existing on power circuits operating at elevated voltage and current levels.

More specifically, a conventional GFCI device, in accordance with the present invention, is utilized to directly sense low level ground fault currents, and thus, unlike the systems of the above-noted patent and co-pending application, does not utilize a ground fault sensor, such as a zero sequence transformer, coupled with the load current carrying conductors of the power circuit. To this end, one side of the GFCI internal circuit is connected in series with the circuit conductor path solidly connecting the power circuit source to ground. Since any current flowing through a ground fault on the power circuit must flow through this circuit path in returning to the source, the GFCI device is in a position to directly monitor the magnitude of this returning ground fault current. If the ground fault current exceeds the trip threshold level of the GFCI device, for example, 5 milliamperes, the GFCI device initiates a ground fault trip function. Switch means incorporated with the GFCI device, either in the form of the internal GFCI device contacts or an accessory switch adapted to the GFCI device for actuation in response to a trip function, controls the electrical energization of a suitable actuator operating to initiate opening of contacts of a circuit interrupting device wired into the power circuit, thereby clearing the ground fault on the power circuit in response to the ground fault trip function initiated by the GFCI device.

The invention accordingly comprises the features of construction, and arrangement of parts which will be exemplified in the constructions hereinafter set forth, and the scope of the invention will be indicated in the claims.

For a better understanding of the nature and objects of the invention, reference should be had to the following detailed description taken in conjunction with the accompanying drawing, in which:

FIG. 1 is a circuit diagram, partially in block form, of a ground fault protection system construction in accordance with one embodiment of the present invention; and FIG. 2 is a circuit diagram, partially in block form, of a ground fault protection system constructed in accordance with an alternative embodiment of the present invention.

Like reference numerals refer to corresponding parts throughout the several figures of the drawing.

DETAILED DESCRIPTION

Figure 1:
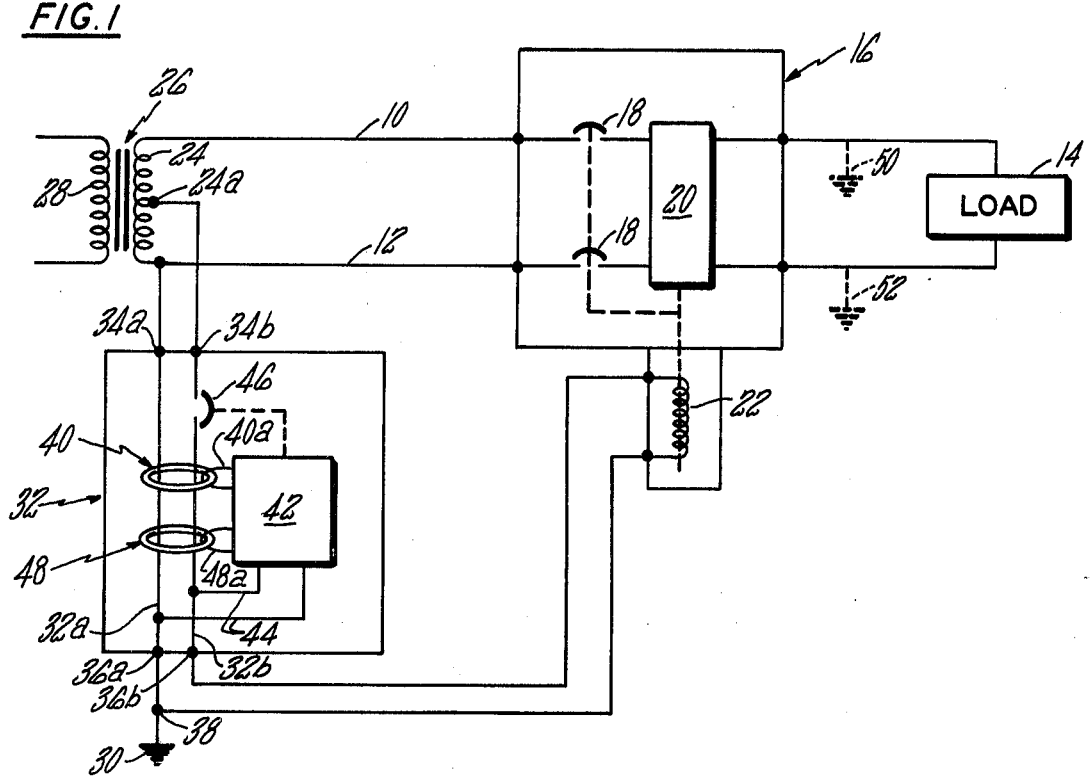

Turning to the drawing, the ground fault protection system of the present invention, in its embodiment of FIG. 1, is depicted in its application to an industrial power circuit operating at elevated current and voltage levels in supplying power over conductors 10 and 12 to a load 14. Included in this power circuit is a conventional circuit interrupter, such as a two pole circuit breaker generally indicated at 16, having separable contacts 18 connected in series with each of the power circuit conductors 10, 12. The circuit breaker also includes, as diagrammatically illustrated in FIG. 1, a trip unit 20 of known construction which is responsive to the levels of current flowing in the power circuit for effecting automatic opening of the breaker contacts under overload and short circuit conditions.

Operatively associated with circuit breaker 16 in a well known manner is an undervoltage release solenoid 22. As is well understood in the art, an undervoltage release solenoid in its adaptation to a circuit breaker is designed to magnetically attract its plunger to an inactive position against the bias of a spring as long as its coil is sufficiently energized. With the plunger in its attracted, inactive position, the circuit breaker contacts 18 may be manually closed and can remain closed. Should the level of energization of the solenoid coil fall below a predetermined level, as occasioned by a persistent undervoltage condition or a power interruption, the return spring takes control, pulling the plunger out to its retracted position where it trippingly engages a circuit breaker latch to automatically open the breaker contacts.

For reasons to be made apparent from the description to follow, the immediate source of electrical power for load 14 is derived from the secondary winding 24 of isolation transformer 26 whose primary winding 28 is connected to a suitable main power source (not shown). One side of the secondary winding 24, the lower side in the illustrated example, is solidly connected to ground, indicated at 30, through one side 32a of the internal power circuit of a conventional ground fault circuit interrupting (GFCI) device, generally indicated at 32. While the GFCI device is illustrated in a circuit breaker configuration, it will be understood that it may be constituted in a receptacle configuration. When utilizing a GFCI circuit breaker, the lower side of secondary winding 24 is connected to ground 30 via the neutral side of the device internal circuit. Thus, the lower side of the secondary winding is connected to the so-called "panel neutral" terminal 34a of the GFCI device 32, while the so-called "load neutral" terminal 36a thereof is connected to ground 30. If a GFCI receptacle is utilized, the lower side of the secondary winding may be connected to ground through either side of the device of the internal circuit since the receptacle version is designed to accommodate cross-wiring.

Line terminal 34b of the GFCI circuit breaker is connected to a tap 24a on transformer secondary winding 24 at which is developed a voltage corresponding to the voltage rating of the GFCI circuit breaker 32. Line terminal 34b is connected via the line side 32b of the internal GFCI circuit breaker power circuit to the so-called "load power" terminal 36b which, in turn, is connected to one side of undervoltage release solenoid 22. The other side of the undervoltage release solenoid is connected to a junction 38 between load neutral terminal 36a and ground 30. It is thus seen that the voltage tapped from transformer secondary winding 24 is impressed across the undervoltage release solenoid 22 which is designed such that this voltage provides sufficient energization to hold its plunger in the attracted, inactive position, allowing the breaker contacts 18 to close and remain closed.

As is well understood in the art, GFCI circuit breaker 32 includes a differential current transformer, generally indicated at 40, throgh which the two sides 32a, 32b of the GFCI circuit breaker internal circuit pass to provide single turn primary windings therefor. A multi-turn secondary winding 40a for this differential current transformer is connected to an electronic module 42 which receives operating power from the two sides of the GFCI circuit breaker internal circuit via leads 44. Should am imbalance occur in the currents flowing in the two sides of this circuit, the differential current transformer develops a ground fault signal in its secondary winding which is processed by the electronic module 42. If this ground fault signal is found to exceed a predetermined magnitude and duration, an electronic switch is triggered to complete an energization circuit for a solenoid (not shown), which is then actuated to initiate opening of contacts 46 included in line side 32b of the GFCI circuit breaker internal circuit.

The GFCI circuit breaker 32 also includes a second transformer, generally indicated at 48 through which circuit side 32a and 32b pass as single turn secondary windings. A multi-turn primary winding 48a for this transformer is connected to electronic module 42. Again as is well understood in the art, primary winding 48a is driven by an oscillator included in electronic module 42 for the purpose of inducing a voltage on its primary winding included in side 32a of the internal circuit. If the external circuit upstream of terminal 34a becomes grounded through a low impedance ground fault, it is seen that, with terminal 36a solidly connected to ground at 30, a closed loop is created, and the induced voltage in this secondary winding of transformer 48 is effective to produce a circulating current which creates a primary current imbalance in differential current transformer 40 of sufficient magnitude to initiate a ground fault trip function. This is a conventional technique for enabling the GFCI circuit breaker to respond to a low impedance ground fault on the neutral conductor which, in conventional GFCI device installations, would have the effect of degrading the ability of the differential current transformer 40 to sense the true magnitude of ground fault current flowing through a line to ground fault.

From the foregoing description, it is seen that under normal conditions, the power circuit load current is carried exclusively by conductors 10 and 12 between load 14 and its immediate source, i.e., secondary winding 24 of isolation transformer 26. The voltage tapped from transformer secondary winding 24 produces an energizing current for undervoltage release solenoid 22 which flows equally in the two sides of the GFCI circuit breaker internal circuit, thus maintaining a current balance in the two primary windings of differential current transformer 40. Should a high impedance ground fault, such as indicated at 50, exist on conductor 10 of the power circuit, any ground fault current flowing through this fault is constrained to flow through an extraneous ground circuit path, ground 30 and side 32a of the GFCI circuit breaker internal circuit in returning to the immediate source of this ground fault current, i.e., secondary winding 24 of isolation transformer 26. Since this ground fault current flows through only one side of the GFCI circuit breaker internal circuit, differential current transformer 40 becomes unbalanced. If the magnitude of this ground fault current exceeds 5 milliamps, the typical trip threshold level for conventional GFCI devices, the ground fault signal induced in secondary winding 40a is of sufficient magnitude to cause electronic module 42 to initiate a trip function. GFCI device contacts 46 open to interrupt the energization circuit for undervoltage release solenoid 22, which drops out to initiate opening of breaker contacts 18 to clear ground fault 50. It is seen that the purpose of isolation transformer 26 is to make it convenient for establishing an exclusive circuit path through which ground fault current must flow in returning to its source and thus, by including the GFCI device 32 in this exclusive circuit path, the true magnitude of ground fault current can be detected. Thus, transformer 26 is seen to effectively isolate the immediate or branch power circuit feeding load 14 from possibly multiple upstream distribution circuit grounding points.

It will be additionally noted that the ground fault protection system of the present invention is equally responsive to the existence of potentially desensitizing low impedance ground faults on conductor 12 of the power circuit, such as indicated at 52. It is seen that if ground faults 50 and 52 should exist concurrently, a portion of the ground fault current flowing through fault 50 could return to secondary winding 24 via fault 52 and conductor 12 thus bypassing GFCI circuit 32 and, as a result, would not be detected thereby. Fortunately, conventional GFCI devices as utilized in the system of the present invention are equipped to respond to a low impedance ground fault 52. It is seen that the existence of this ground fault, in conjunction with conductor 12 and the ground fault connection 30, completes a loop circuit for the secondary winding of transformer 48 connected in side 32a of the GFCI circuit breaker internal circuit. Since primary winding 48a of transformer 48 is being driven by an oscillator within electronic module 42, the resulting induced voltage appearing on this is effective to produce a circulating current in this circuit loop. If fault 52 is of sufficiently low impedance, the magnitude of this circulating current is sufficient to unbalance differential current transformer 40 to the point of precipitating a ground fault trip function. The GFCI device contacts 46 open to interrupt the energization circuit for undervoltage release solenoid 22, tripping circuit breaker 16 to interrupt the power circuit.

From the foregoing description of FIG. 1, it is seen that the present invention provides a ground fault protection system readily capable of affording personnel protection for power circuits operating at elevated voltage and current levels. The system utilizes a conventional GFCI device which is implemented in a fashion to directly monitor ground fault current flowing through a ground fault on the power circuit, and yet is not subjected to the elevated voltage and current levels at which the power circuit is operated. Since the GFCI device is connected with the power circuit in a manner as to be directly affected by the existence of ground fault current, it is readily capable of detecting ground fault currents at the 5 milliamp threshold level requisite for personnel protection. While the embodiment of FIG. 1 is illustrated as utilizing a circuit breaker and undervoltage release solenoid for effecting interruption of the power circuit in response to detection of a ground fault by the GFCI circuit breaker, it will be appreciated that the circuit breaker could be replaced with a contactor, in which case the function of the undervoltage release solenoid would be served by the contactor holding coils.

Figure 2:
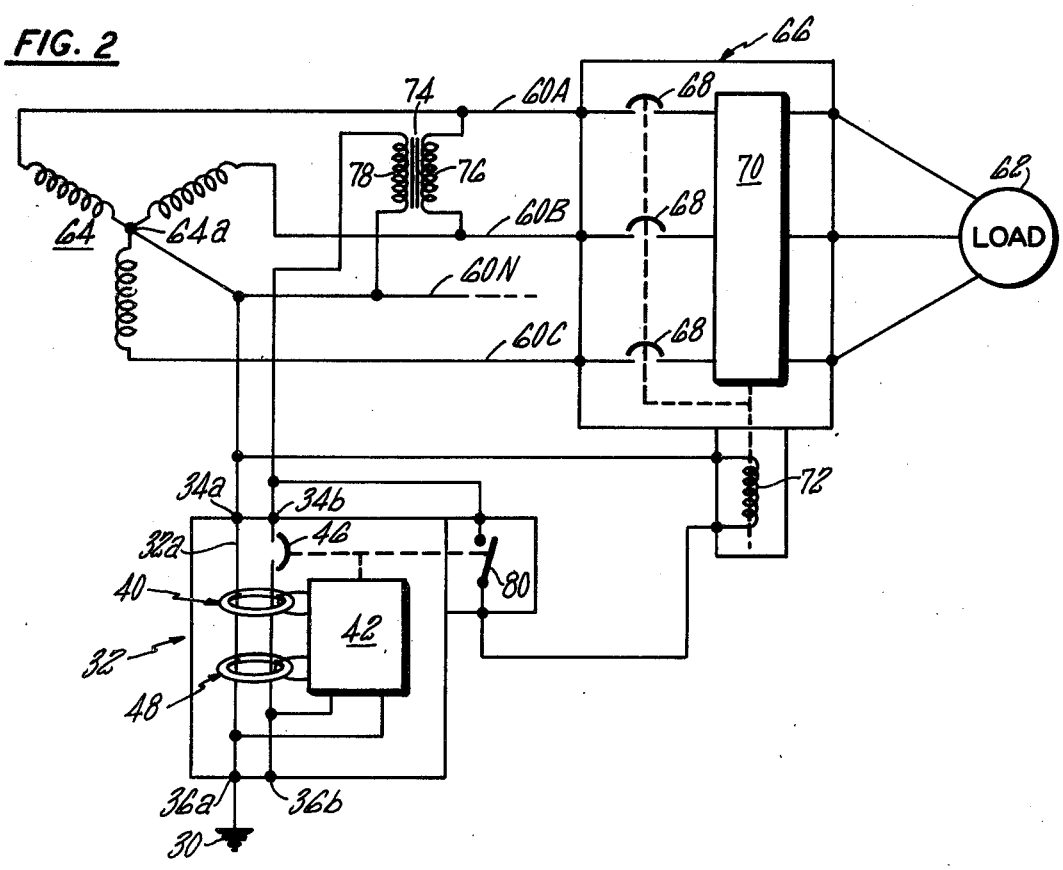

In the embodiment of the invention seen in FIG. 2, the power circuit is illustrated as a three-phase circuit including phase conductors 60A, 60B and 60C and a neutral conductor 60N supplying power to a load 62 from a wye connected source 64. Included in this power circuit is a conventional three-pole circuit breaker, generally indicated at 66, having separable contacts 68 connected in series with each phase conductor. The circuit breaker also includes a trip unit 70 of known construction which is responsive to the levels of current flowing in the three-phase conductors for effecting automatic opening of the breaker contacts under overload and short circuit conditions.

Operatively associated with circuit breaker 66 in a well known manner is a shunt trip solenoid 72. As is well understood in the art, a shunt trip solenoid in its adaptation to a circuit breaker is normally de-energized, but when it is necessary to trip the breaker, its coil is energized. Its plunger is magnetically attracted from an inactive to an actuated position, in the process striking a latch associated with the trip unit. The latch releases the breaker mechanism which then operates under the power of a mechanism spring to abruptly open the breaker contacts.

The neutral point 64a of source 64 is brought out for connection to neutral conductor 60N of the power circuit and also for connection to terminal 34a of a GFCI circuit breaker 32 of the same construction as the GFCI circuit breaker illustrated in the embodiment of FIG. 1. Terminal 36a of the GFCI circuit breaker is connected to ground at 30.

To derive a suitable voltage for powering the GFCI circuit breaker, a transformer 74 includes a primary winding 76 suitably connected for energization from source 64, for example, between phase conductor 60A and 60B as illustrated in FIG. 2. The upper side of transformer secondary winding 78 is connected to terminal 34b of GFCI circuit breaker 32, while its lower side is connected to neutral conductor 60N. It is thus seen that the two sides of secondary winding 78 are connected ultimately across GFCI circuit breaker terminals 34a and 34b for powering electronic module 42.

In contrast to the embodiment of FIG. 1, the GFCI circuit breaker 32 of FIG. 2 is externally adapted with an accessory switch 80. This switch may be in the form of an auxiliary switch mechanically coupled with a GFCI circuit breaker mechanism and operated thereby to assume a normally open position while the breaker contacts 46 are closed and to assume a closed position whenever the breaker contacts are open. Preferably however, switch 80 is of the so-called "trip or bell alarm" type physically adapted to a GFCI circuit breaker in the same manner as currently being adapted to conventional residential-type circuit breakers. A bell alarm switch is mechanically adapted to a circuit breaker so as to be insensitive to manual opening of the breaker contacts, but is actuated to its closed condition in response to tripping of the circuit breaker. As seen in FIG. 2, switch 80 is utilized to control energization of shunt trip solenoid 72 associated with circuit breaker 66. That is, the upper side of shunt trip solenoid 72 is connected directly to a junction between neutral conductor 60N and GFCI circuit breaker terminal 34a, while the other side of the shunt trip solenoid is wired through switch 80 to a junction between the upper side of transformer secondary winding 78 and GFCI circuit breaker terminal 34b. Thus, as long as switch 80 is in its normally open condition, shunt trip solenoid 72a is not energized from the secondary winding 78 of transformer 74.

In the event of a ground fault on any of the phase conductors of the power circuit, ground fault current flowing through such a fault, in order to return to source 64, is constrained to flow through the ground connection 30, and side 32a fo the GFCI breaker internal circuit, to source neutral point 64a. If this ground fault current is of 5 milliamps or more, differential current transformer 40 is sufficiently unbalanced to cause module 42 to initiate a ground fault trip function culminating in opening of the GFCI breaker contacts 46. More significantly however is the fact that the opening of contacts 46 precipitates closure of switch 80, thereby completing the energization circuit for shunt trip solenoid 72 which then acts to trip circuit breaker 66, clearing the ground fault. As in the embodiment of FIG. 1, GFCI circuit breaker 32 is responsive to a ground fault on neutral conductor 60N having the potential of routing phase-to-ground fault current around the GFCI circuit breaker in returning to source 64. Any such neutral ground fault completes a loop circuit through which circulating current is caused to flow by the action of transformer 48; this circulating current unbalancing differential current transformer 40 to initiate a ground fault trip function by electronic module 42. Switch 80 closes to complete the energization circuit for shunt trip solenoid 72 from secondary winding 78 of transformer 74 to precipitate tripping of circuit breaker 66.

It will be appreciated that the undervoltage release solenoid or holding coil approach of FIG. 1 in initiating opening of the power circuit interrupter contacts in response to a ground fault may be utilized in the embodiment of FIG. 2, just as the auxiliary or bell alarm switch and shunt trip solenoid approach of FIG. 2 can be utilized in the embodiment of FIG. 1. It will be noted in the embodiment of FIG. 2 that the GFCI breaker contacts 46 are not electrically involved in the energization circuit for shunt trip solenoid 72. Consequently, the opening of these contacts in response to a ground fault trip function is merely incidental to the closure of swtich 80 and consequent energization of the shunt trip solenoid 72. It will be appreciated that a secondary load circuit may be connected to the load end terminals 36a and 36b of the GFCI breaker 32. However, due to the location of ground 30, this secondary circuit would not be afforded ground fault protection. Since conventional GFCI circuit breakers do include automatic overcurrent tripping capability, any secondary load connected across terminals 36a, 36b would be afforded overload and short circuit protection. While the primary 76 of transformer 74 in FIG. 2 is shown connected phase-to-phase, it will be appreciated that it could be connected from phase-to-neutral, in which case the transformer could take the form of an autotransformer.

It will be readily understood by those skilled in the art that the ground fault protection system of the present invention may be prone to nuisance tripping if applied to a power circuit having significant standing leadkage current. However, in such applications, the GFCI device trip threshold level may be readily adjusted upwardly to take into account standing leakage current and still provide a high degree of personnel protection. Inasmuch as the ground fault protection system of the present invention is uniquely structured to provide personnel protection, it will be readily appreciated that, in the process, it provides equipment protection as well.

Since in the shunt trip embodiment of FIG. 2, terminal 36b is not utilized, the only purpose served by the GFCI device internal circuit side between this terminal and terminal 34b is to power up module 42. Thus, module power may be tapped directly from terminals 34a and 34b, which would permit the elimination of the GFCI internal circuit side between terminals 34b and 36b. In this case, differential current transformer 40 would have only one primary winding and transformer 48 would have only one secondary winding, yet it is seen that the embodiment of FIG. 2 will nevertheless operate in response to ground faults on the phase and neutral conductors of the power circuit in the manner described above. This approach has the advantage of permitting the GFCI internal circuit side 32a to be implemented in a larger wire size than could otherwise be accommodated through the apertures of the transformer cores in the presence of the other internal circuit side.

It will thus be seen that the objects set forth, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. A ground fault protection system for a power circuit including a source connected to supply current to a load, said system comprising, in combination:

A. a circuit interrupter having contacts connected in the power circuit between the source and the load;

B. an actuator coupled with said circuit interrupter and operable to initiate opening of said interrupter contacts, thereby to interrupt the flow of current between the source and the load;

C. a GFCI device including
  (1) a first internal circuit side through which the source is solidly connected to ground,
  (2) a second internal circuit side connected with the source such that the source develops energization voltage across said first and second internal circuit sides,
  (3) a differential current transformer having a first primary winding serially included in said first internal circuit side, a second primary winding serially included in said second internal circuit side, and a secondary winding in which is developed a ground fault signal indicative of an imbalance in the currents flowing in said primary windings as occasioned by ground fault current flowing through a ground fault on the power circuit and returning to the source via said first internal circuit side,
  (4) an electronic module connected across said first and second internal circuit sides so as to be powered by the energization voltage and operating in response to said ground fault signal to initiate a ground fault trip function, and
(5) switch means connected to electrically control said actuator and operatively coupled to said module so as to be actuated in response to a ground fault trip function, actuation of said switch means controlling said actuator to precipitate opening of said interrupter contacts.

2. The system defined in claim 1, wherein said actuator is an undervoltage release solenoid connected to said GFCI device for energization from the source via said first and second internal circuit sides, and said switch means comprises GFCI device internal contacts operable to open up at least one of said first and second internal circuit sides in response to a ground fault trip function.

3. The system defined in claim 1, wherein said actuator is a shunt trip solenoid connected via an energization circuit to the source, and said switching means comprises an accessory switch electrically connected in said energization circuit and operatively coupled with said module for closure automatically in response to a ground fault trip function.

4. The system defined in claim 1, wherein said GFCI device further includes means for producing a current imbalance in said primary windings pursuant to initiating a ground fault trip function in response to the existence of a low impedance ground on a conductor of the power circuit connected in common with said first internal circuit side of said GFCI device.

5. The system defined in claim 1, wherein the source is a three phase, wye connected source having its neutral point brought out for common connection to a neutral conductor of the power circuit and to ground via said first internal circuit side of said GFCI device, said system further including a transformer having a primary winding connected for energization from the source and a secondary winding having one side connected to said GFCI device second internal circuit side and another side connected to the power circuit neutral conductor.

6. The system defined in claim 5, wherein said GFCI device further includes means for producing a current imbalance in said primary winding pursuant to initiating a ground fault trip function in response to the existence of a low impedance ground fault on the neutral conductor of the power circuit.

7. A ground fault protection system for a power circuit suppling current to a load, said system comprising, in combination:
A. an isolation transformer having a primary winding for electrical energization from a current source and a secondary winding connected via the power circuit to the load;
B. a circuit interrupter having contacts connected in the power circuit between said isolation transformer secondary winding and the load;
C. an actuator coupled with said circuit interrupter and operable to initiate opening of said interrupter contacts, thereby to interrupt current flow to the load;
D. A GFCI device including
(1) a first internal circuit side through which one side of said isolation transformer secondary winding is solidly connected to ground,
(2) a second internal circuit side connected to tap on said isolation transformer secondary winding such that energization voltage is developed across said first and second internal circuit sides,
(3) a differential current transformer having a first primary winding serially included in said first internal circuit side, a second primary winding serially included in said second internal circuit side, and a secondary winding in which is developed a ground fault signal indicative of an imbalance in the current flowing in said primary windings as occasioned by ground fault current flowing through a ground fault on the power circuit and returning to said one side of said isolation transformer secondary winding via said first internal circuit side,
(4) an electronic module connected across said first and second internal circuit sides so as to be powered by the energization voltage and operating in response to said ground fault signal to initiate a ground fault trip function, and
(5) switch means connected to electrically control said actuator and operatively coupled to said module so as to be actuated in response to a ground fault trip function, actuation of said switch means controlling said actuator to precipitate opening of said interrupter contacts.

8. The system in claim 7, wherein said GFCI device further includes means for producing a current imbalance in said differential current transformer primary windings pursuant to initiating a ground fault trip function in response to the existence of a low impedance ground fault on a conductor of said power circuit common to said one side of said isolation transformer secondary winding.

9. The system defined in claim 8, wherein said actuator is an undervoltage release solenoid connected to said GFCI device for energization from said isolation transformer secondary winding via said first and second internal circuit sides, and said switch means comprises GFCI device internal contacts operable to open up at least one of said first and second internal circuit sides in response to a ground fault trip function.

10. A ground fault protection system for a power circuit including a source connected to supply current to a load, said system comprising, in combination:
A. a circuit interrupter having contacts connected in the power circuit between the source and load;
B. an actuator coupled with said circuit interrupter and operable to initiate opening of said interrupter contacts, thereby to interrupt the flow of current between the source and load;
C. a GFCI device including
(1) first and second input terminals electrically connected to be energized from the source,
(2) an output terminal solidly electrically connected to ground,
(3) an internal circuit path electrically connected between said first input terminal and said output terminal, thereby connecting a side of the source to ground,
(4) a first current transformer having a primary winding serially included in said internal circuit path and a secondary winding in which is developed a ground fault signal in response to ground fault current flowing through a ground fault on the power circuit and returning to the source via said internal circuit path,
(5) an electronic module electrically connected to said first and second input terminals so as to be powered from the source and operating in response to said ground fault signal to initiate a ground fault trip function, and (6) means for impressing a current on said internal circuit path of a magnitude sufficient to produce said ground fault signal in said transformer secondary winding in response to the existence of a low impedance ground fault on a conductor of the power circuit electrically common to said first input terminal;

D. switch means included in an electrical energization circuit for said actuator, said switch means operatively coupled with said GFCI device so as to be actuated in response to a ground fault trip function initiated by said module, actuation of said switch means controlling said actuator to precipitate opening of said interrupter contacts.

11. The system defined in claim 10, wherein said current impressing means comprises a second transformer having a secondary winding serially also included in said internal circuit path and a primary winding energized from said module.

* * * * *